United States Patent [19]
Menegoli

[11] Patent Number: 5,438,504
[45] Date of Patent: Aug. 1, 1995

[54] VOLTAGE MULTIPLIER CIRCUITS OR THE LIKE

[75] Inventor: Paolo Menegoli, Milpitas Calif.

[73] Assignee: SGS-Thomson Microelectronics, Inc., Carrollton, Tex.

[21] Appl. No.: 133,573

[22] Filed: Oct. 8, 1993

[51] Int. Cl.⁶ ............................................. H02M 3/18
[52] U.S. Cl. ...................................... 363/60; 307/110
[58] Field of Search ................... 363/59, 60; 307/110, 307/592, 596, 597

[56] References Cited

U.S. PATENT DOCUMENTS

| | | | |
|---|---|---|---|
| 4,922,403 | 5/1990 | Feller | 363/60 |
| 5,034,875 | 7/1991 | Hattori | 363/60 |
| 5,051,881 | 9/1991 | Herold | 363/60 |
| 5,095,223 | 3/1992 | Thomas | 307/110 |
| 5,132,895 | 7/1992 | Kase | 363/60 |

*Primary Examiner*—Steven L. Stephan
*Assistant Examiner*—Matthew V. Nguyen
*Attorney, Agent, or Firm*—Richard A. Bachand; Joseph C. Arrambide; Lisa K. Jorgenson

[57] ABSTRACT

A voltage multiplier has first, second, and third capacitors, each having first and second plates. The multiplied output voltage is developed between the first and second plates of the third capacitor. First and second diodes are connected respectively between first plates of the first and second and the second and third diodes. A switch is connected between the supply voltage and the first plate of the first capacitor. First and second inverters are provided, each having an input, and having an output connected respectively to the second plates of the first and second capacitors. The first inverter is connected to the supply voltage to produce the supply voltage as an output of the first inverter when a low state is applied to the input of the inverter. The second inverter is connected to the first plate of the first capacitor to produce a voltage from the first capacitor as an output of the second inverter when a low state is applied to the input of the second inverter. A control signal generator has output signals connected to the switch, and inputs of the first and second inverters, the output signals being timed to open the switch and apply low states to the inputs of the first and second inverters, then to close the switch and apply high states to the inputs of the first and second inverters.

14 Claims, 1 Drawing Sheet

VOLTAGE MULTIPLIER CIRCUITS OR THE LIKE

BACKGROUND OF THE INVENTION

1. Field of the Invention

This invention relates to improvements in electrical circuits, and more particularly to improvements in voltage multiplier circuits or the like.

2. Relevant Background

In many applications, developing a source of voltage that has been multiplied from a lower supply voltage is desired. As pressures have increased for lower and lower supply voltages, the need for such voltage multipliers has likewise increased. One solution that has been widely used is the use of a charge pump that can produce, for example, a 10 volt output supply level from a 5 volt input supply level.

Circuits have also been proposed that use a capacitor to receive a switched input voltage, and an inverter to apply a higher voltage to the low side, or plate, of the capacitor thereby boosting the voltage on the high side, or plate, of the capacitor. The boosted voltage is then transferred via a rectifier or the like to an output capacitor on which the boosted voltage is maintained. Such circuits, however, are generally single stages, or, when multiple stages are employed, the stages are generally merely cascaded together. The result of such cascaded circuits is that the starting voltage is merely added to the output voltage of the preceeding stage for each additional stage.

What is needed is a voltage multiplier circuit that can produce a multiplied voltage three or more times larger than an input voltage, using essentially the same number and type of parts as the aforementioned cascaded voltage multiplying circuits.

SUMMARY

In light of the above, it is, therefore, an object of the invention to provide an improved voltage multiplier circuit.

It is another object of the invention to provide an improved voltage multiplier circuit of the type described that can produce three or more times increase in the output voltage from an input voltage, without requiring significantly larger numbers of parts, than traditional cascaded voltage multipliers.

These and other objects, features, and advantages will be apparent to those skilled in the art from the following detailed description when read in conjunction with the accompanying drawings and appended claims.

In accordance with a broad aspect of the invention, a voltage multiplier for producing a multiplied output voltage from a supply voltage is presented. The voltage multiplier has first and second voltage multiplying stages. The first voltage multiplying stage receives the supply voltage as a power input, and is connected to produce an output that is a first multiplied voltage from the supply voltage. The second voltage multiplying stage receives the first multiplied voltage as a power input, and is connected to produce an output that is a second multiplied voltage. Each of the first and second voltage multiplying stages has a capacitor and an inverter connected to control a reference voltage on the capacitor. Means, such as a rectifier, interconnects the first and second voltage multiplying stages for maintaining the voltage on the capacitors of each stage.

In accordance with another broad aspect of the invention, a voltage multiplier is presented that has first, second, and third capacitors, each having first and second plates. The multiplied output voltage is developed between the first and second plates of the third capacitor. First and second diodes connected respectively between first plates of the first and second capacitors, and between first plates of the second and third capacitors. A switch is connected between the supply voltage and the first plate of the first capacitor. First and second inverters are provided, each having an input, and having an output connected respectively to the second plates of the first and second capacitors. The first inverter is connected to the supply voltage to produce the supply voltage as an output of the first inverter when a low state is applied to the input of the inverter. The second inverter is connected to the first plate of the first capacitor to produce a voltage from the first capacitor as an output of the second inverter when a low state is applied to the input of the second inverter. A control signal generator has output signals connected to the switch, and inputs of the first and second inverters, the output signals being timed to open the switch and apply low states to the inputs of the first and second inverters, then to close the switch and apply high states to the inputs of the first and second inverters.

In accordance with yet another broad aspect of the invention, a voltage multiplier has first, second, and third capacitors, each having first and second plates, the multiplied output voltage being developed between the first and second plates of the third capacitor. First means are provided for transferring voltage in one direction onto the first capacitor and for resisting the discharge of the voltage from first capacitor in another direction connected between the first plate of the first capacitor and the supply voltage. Second means are provided for transferring voltage in one direction onto the second capacitor and for resisting the discharge of the voltage from the second capacitor in another direction connected between the first plates of the first and second capacitors. Third means are provided for transferring voltage in one direction onto the third capacitor and for resisting the discharge of the voltage from the third capacitor in another direction connected between the first plates of the second and third capacitors. First and second inverters are provided, each having an input, and having an output connected respectively to the second plates of the first and second capacitors. The first inverter is connected to the supply voltage, whereby the supply voltage appears as an output of the first inverter when a low state is applied to the input of the first inverter. A power supply input of the second inverter is connected to the first plate of the first capacitor, whereby a voltage on the first plate of the first capacitor appears as an output of the second inverter when a low state is applied to the input of the second inverter. A control signal generator has output signals connected to the switch, and inputs of the first and second inverters, the output signals is timed to open the switch and apply low states to the inputs of the first and second inverters, then to close the switch and apply high states to the inputs of the first and second inverters.

BRIEF DESCRIPTION OF THE DRAWINGS

The invention is illustrated in the accompanying drawings in which.

DETAILED DESCRIPTION OF THE PREFERRED EMBODIMENTS

Figure 1:
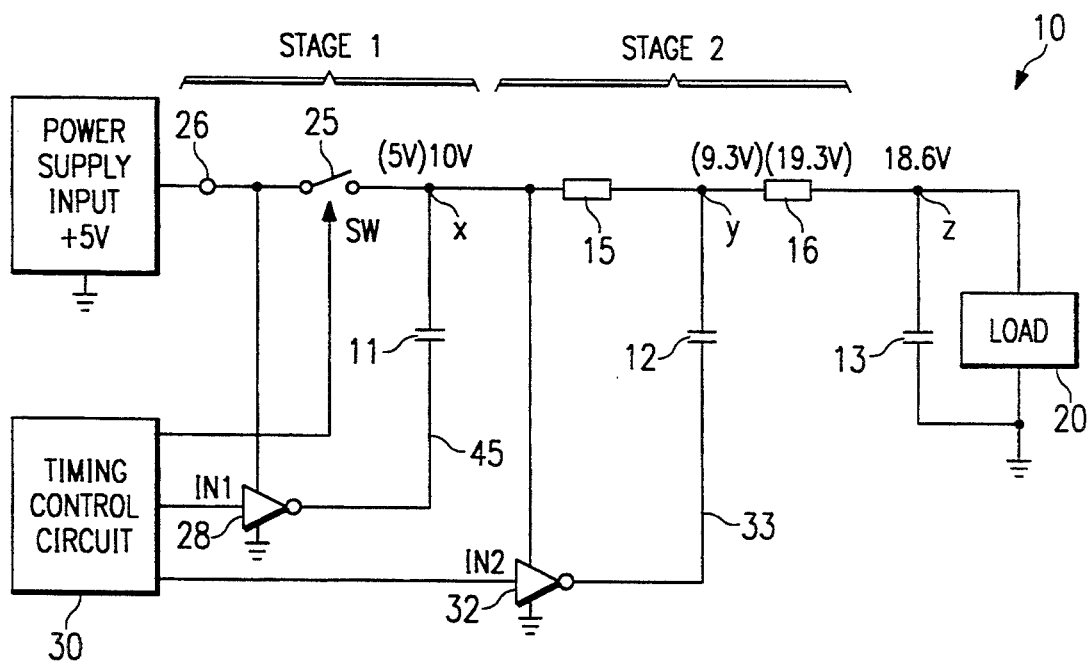
FIG. 1 is an electrical schematic diagram of a voltage multiplier circuit in accordance with a preferred embodiment of the invention.

An electrical schematic diagram of a voltage multiplier circuit 10 in accordance with a preferred embodiment of the invention is shown in FIG. 1. The voltage multiplier circuit 10 includes three capacitors 11, 12, and 13. One plate of the capacitor 11 is connected to the anode of a first diode 15, at node "x", and a first plate of the second capacitor 12 is connected to the anode of a second diode 16, at node "y". A first plate of the third capacitor 13 is connected to the cathode of the diode 16, at node "z". The output voltage is developed across the third capacitor 13, for connection, for example, to a load 20. The load 20 can be a resistive, capacitive, or inductive impedance, or combination thereof.

A switch 25 is connected in series between the anode of the first diode 15 and a terminal 26 to which a supply voltage, such a +5 volts, can be supplied. A first inverter 28 has its output connected to the second plate of the capacitor 11, and its input, IN1, connected to receive a control signal from a timing control circuit 30. The biasing lines of the first inverter 28 are connected, as shown, between the input terminal 26 to which the voltage supply is applied and a reference potential, or ground. Likewise, a second inverter 32 has its output connected to the bottom plate of the capacitor 12, and its input connected to receive a control signal from the timing control circuit 30. The biasing lines of the second inverter 32 are connected between the anode of the diode 15 and a reference potential or ground, as shown. The inverters 28 and 32 may be of conventional construction wherein when a "high" input signal is applied to the input of the inverter, an output signal appears on the output terminal at the reference potential of the inverter, in this case ground. On the other hand, when a "low" input signal is applied to the input of the inverter, an output signal appears on the output terminal having the same voltage as the supply voltage of the inverter. In this case, and in accordance with the invention, the power supply voltage varies in accordance with the voltage to be boosted by the stage of the multiplier circuit 10 with which the respective inverters are associated.

Figure 2:
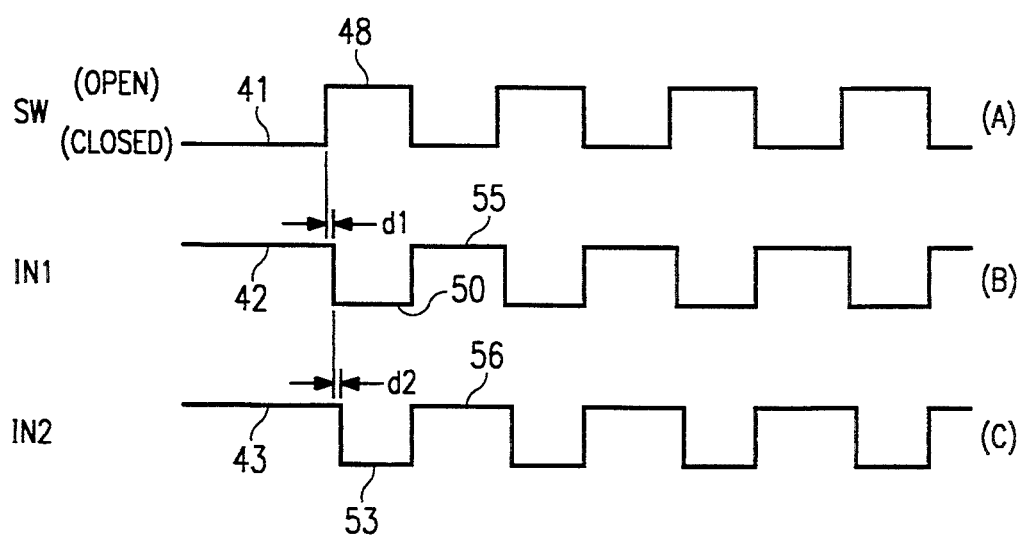
FIGS. 2(A–C) are waveforms of the timing or control signals at various circuit locations in the voltage multiplier circuit of FIG. 1.

The operation of the voltage multiplier circuit 10 is described in conjunction with the waveforms shown in FIGS. 2A, B, and C, which represent, respectively, the control signal applied to the switch (SW), the first inverter 28 (IN1), and the second inverter 32 (IN2). The waveform shown in FIG. 2A, although represented as an analog signal, indicates the open and closed states of the switch 25, which may be provided, of course, by a transistor switch or the like. Thus, initially, the switch 25 is closed for a predetermined time, as indicated by the line segment 41 in FIG. 2A. Initially, when the switch 25 is closed, the inputs IN1 and IN2 are high, as shown by line segments 42 and 43 in FIG. 2B and 2C, respectively. During this time, the output from the inverter 28 on line 45 is low. Thus, the capacitor 11 charges to a voltage level at which +5 volts appears on the top or first plate and 0 volts appears on the bottom plate.

At this time, the +5 volts appearing on the upper plate of the capacitor 11 is allowed to pass the diode 15 to also charge the upper plate of the second capacitor 12. Because of the inherent voltage drop of the diode 15, however, the voltage appearing on node "y", will be slightly less than +5 volts, or about +4.3 volts. Additionally, a portion of the +4.3 volts will be allowed to pass the diode 16 to charge the top plate of the third capacitor 13, again to a reduced voltage value due to the voltage drop across the diode 16.

After the initial voltage value has been established on the capacitors 11–13, the switch 25 is caused to open by a signal on line SW from the timing control circuit 30, denoted by the line segment 48 in FIG. 2A. At this point, the diodes 15 and 16 prevent the voltage on respective capacitors 12 and 13 from discharging back into the first capacitor 11. Immediately thereafter, for instance, after a very short delay d1, shown in FIG. 2B, the signal on the input of the first inverter 28 is switched from high to low, shown by the line segment 50 in FIG. 2B. The output from the inverter 28 on line 45 changes state from low to high, and, more specifically, from the reference potential to the bias potential on the inverter 28, in this case, 5 volts. The upper plate of the capacitor 11 immediately raises node "x" to +10 volts with respect to the reference potential.

The +10 volt potential is transferred by the first diode 15 to the node "y" to charge the upper plate of the second capacitor 12. Again, due to the voltage drop across the second diode 15, the +10 volts on node "x" is reduced by the voltage drop across the diode 15, to result in a slightly reduced voltage of about 9.3 volts on node "y".

Immediately thereafter, or after a short delay, d2, shown in FIG. 2C, the voltage on the input line IN2 to the second inverter 32 is changed from high to low, as shown by segment 53. The output from the inverter 32 on line 33 changes from low to high in response, more specifically, from the reference potential to the potential appearing on node "x", which provides the supply voltage to the inverter 32. As noted above, the potential on node "x" is now +10 volts. This immediately raises the potential with respect to ground or the reference potential, by +10 volts, thereby boosting the voltage on the top plate of the capacitor 12 to +19.3 volts, on node "y". As before, the voltage on node "y" is allowed to pass through the second diode 16 to continue to charge the top plate of the capacitor 13 to the boosted or multiplied voltage, which appears on node "z". A portion of the boosted voltage is dropped across the second diode 16, so that approximately +18.6 volts appears on the top plate of the capacitor 13 on node "z".

Shortly after the charging cycle has been completed, the switch 25 is again closed to continue the charging process in the manner described above. The input signals to the respective first and second inverters 28 and 32 are again raised to a high state as denoted by respective line segments 55 and 56 in FIGS. 2B and 2C. In the meantime, the charges that have been developed on capacitors 12 and 13 are held thereon by the respective diodes 15 and 16. Thus, after repetition of the cycles for some predetermined time, the voltages on capacitor 13 will stabilize at the boosted value, in this case, about +18.6 volts.

The respective sizes of the capacitors 11, 12, and 13 can be selected, as desired, the selection criteria being the desired charge current and transfer time that is necessary in the particular application in which the circuit 10 is employed. One particular ratio that can be used, for example, is to size capacitor 11 at about 500 picofarads, capacitor 12 at about 100 picofarads, and to size capacitor 13 at about 1 microfarad. It should be noted that capacitor 12 is preferably smaller than capacitor 11 to avoid undue drainage of the first capacitor 11 by the second capacitor 12 as charge is transferred therebetween.

It should also be noted that the primary function of the diodes 15 and 16 is to hold the transfer charge on the respective capacitors to which the multiplied charge is applied and stored. It will be appreciated that the diodes 15 and 16 can be replaced with switches (not shown) with appropriate timing to transfer charge in the right hand moving direction in the circuit 10 shown FIG. 1, but to not allow the charge to discharge. The advantage in substituting switches in place of the diodes 15 and 16 is the elimination or reduction of the voltage drops that are created in the final voltage by the diodes 15 and 16. In a similar fashion, a diode (not shown) can be substituted for the switch 25 if desired. This, however, increases the voltage drop on the final voltage developed in the manner described above, but has an attendant advantage of eliminating the control line and signal generation thereon. Of course at the lower voltage levels, the voltage drop across a diode (typically 0.7 volts) has a larger impact than at the higher levels in the circuit. Consequently, the voltage isolating function of the first stage is preferably by a switch 25 as shown rather than a diode.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A voltage multiplier for producing a multiplied output voltage from a supply voltage, comprising:
   a first voltage multiplying stage for receiving the supply voltage as a power input, for producing at an output, a first multiplied voltage based on the supply voltage;
   means for rectification having an input for receiving said first multiplied voltage and having an output;
   a second voltage multiplying stage comprising:
      a capacitor having a first plate connected to the output of said means for rectification and having a second plate;
      an inverter powered by the first multiplied voltage, having an input receiving a timing control signal and having an output connected to the second plate of said capacitor such that the first plate of said capacitor is charged to the first multiplied voltage responsive to the output of said inverter being low, and such that the second plate of said capacitor is biased to the first multiplied voltage when the output of said inverter is high to produce a second multiplied voltage at the first plate of said capacitor.

2. The voltage multiplier of claim 1 wherein said means for rectification comprises a diode.

3. The voltage multiplier of claim 1 wherein said means for rectification comprises a switch.

4. The voltage multiplier of claim 1 wherein further comprising an output capacitor connected to receive said second multiplied voltage.

5. A voltage multiplier for producing a multiplied output voltage from an supply voltage, comprising:
   first, second, and third capacitors, each having first and second plates, the multiplied output voltage being developed between the first and second plates of said third capacitor;
   first and second diodes, connected respectively between first plates of said first and second capacitors, and between first plates of said second and third capacitors;
   a switch connected between the supply voltage and the first plate of said first capacitor;
   first and second inverters, each having an input, and having an output connected respectively to the second plates of said first and second capacitors, said first inverter being connected to said supply voltage to produce said supply voltage as an output of said first inverter when a low state is applied to the input of said first inverter, and said second inverter being connected to said first plate of said first capacitor to produce a voltage from said first capacitor as an output of said second inverter when a low state is applied to the input of said second inverter;
   a control signal generator having output signals connected to said switch, and inputs of said first and second inverters, said output signals being timed to open said switch and apply low states to said inputs of said first and second inverters, then to close said switch and apply high states to said inputs of said first and second inverters.

6. The voltage multiplier of claim 5 wherein said control signals are timed to apply a delay in applying a low state to said first inverter after said switch is opened.

7. The voltage multiplier of claim 6 wherein said control signals are timed to apply a delay in applying a low state to said second inverter after said low state is applied to said first inverter.

8. A voltage multiplier for producing a multiplied output voltage from an supply voltage, comprising:
   first, second, and third capacitors, each having first and second plates, the multiplied output voltage being developed between the first and second plates of said third capacitor;
   first means for transferring voltage in one direction onto said first capacitor and for resisting the discharge of the voltage from first capacitor in another direction connected between the first plate of said first capacitor and the supply voltage;
   second means for transferring voltage in one direction onto said second capacitor and for resisting the discharge of the voltage from said second capacitor in another direction connected between the first plates of said first and second capacitors;
   third means for transferring voltage in one direction onto said third capacitor and for resisting the discharge of the voltage from said third capacitor in another direction connected between the first plates of said second and third capacitors;
   first and second inverters, each having an input, and having an output connected respectively to the second plates of said first and second capacitors, said first inverter being connected to said supply voltage, whereby said supply voltage appears as an output of said first inverter when a low state is applied to the input of said first inverter, and a power supply input of said second inverter being connected to said first plate of said first capacitor, whereby a voltage from said first plate of said first capacitor appears as an output of said second inverter when a low state is applied to the input of said second inverter; and a control signal generator having output signals connected to said switch, and inputs of said first and second inverters, said output signals being timed to open said switch and apply low states to said inputs of said first and second inverters, then to close said switch and apply high states to said inputs of said first and second inverters.

9. The voltage multiplier of claim 8 wherein said second and third means for transferring voltage are diodes.

10. The voltage multiplier of claim 8 wherein said first means for transferring voltage is a switch.

11. The voltage multiplier of claim 8 wherein said first, second, and third means for transferring voltage are diodes.

12. The voltage multiplier of claim 8 wherein said first, second, and third means for transferring voltage are switches.

13. The voltage multiplier of claim 8 wherein said control signals are timed to apply a delay in applying a low state to said first inverter after said switch is opened.

14. The voltage multiplier of claim 13 wherein said control signals are timed to apply a delay in applying a low state to said second inverter after said low state is applied to said first inverter.

* * * * *